Patented Mar. 10, 1942

2,276,116

UNITED STATES PATENT OFFICE 2,276,116

SUBSTITUTED PHENYLPHENOLS

Fred Lowell Taylor and John E. Livak, Midland, Mich., assignors to The Dow Chemical Company, Midland, Mich., a corporation of Michigan No Drawing. Application April 27, 1940, Serial No. 331,946

4 Claims. (Cl. 260—620)

This invention relates to new substituted phenylphenols and in particular concerns phenylphenols substituted in the hydroxylated ring by at least one alkyl group and an α-phenylethyl group occupying a position ortho or para to the hydroxyl group. Such compounds may be represented by the general formula

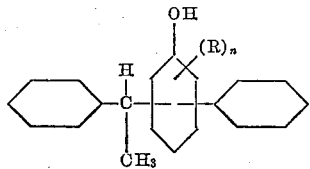

wherein R represents an alkyl radical, n represents an integer not greater than 2, and the α-phenylethyl group occupies a position ortho or para to the hydroxyl group. These compounds are usually obtained as high-boiling viscous liquids, although in some cases they may occur as resinous or crystalline solids. They are substantially insoluble in water but are readily dissolved by such organic solvents as methanol, acetone, chlorobenzene, etc. Certain of these compounds may be employed in the manufacture of phenol-aldehyde type condensation products, and all of them are valuable intermediates in the preparation of plasticizing agents, wetting agents, and other organic chemicals.

The new compounds of the present class are conveniently prepared by direct reaction between an α-haloethylbenzene, such as α-chloroethylbenzene or α-bromoethylbenzene, and an alkylated phenylphenol having an open position ortho or para to the hydroxyl group, such as 2-methyl-4-phenylphenol, 3 - isopropyl-5-phenylphenol, 2-tertiaryoctyl-4-phenylphenol, 4-tertiarybutyl-6-phenylphenol, 2.4-dimethyl - 3 - phenylphenol, etc. The reaction is conveniently carried out simply by heating a mixture of the reactants to a temperature at which hydrogen halide is readily evolved. Such temperature depends somewhat upon the particular reactants employed but is usually between about 100° and about 200° C. If desired, the reaction may be carried out under reduced pressure or in a current of an inert gas in order to facilitate the removal of the hydrogen halide. Upon completion of the reaction, as evidenced by the cessation of hydrogen halide evolution, the substituted phenol product is recovered from the reaction mixture and purified by distillation under reduced pressure or by crystallization from a suitable solvent.

The following example illustrates the preparation of one of the new compounds of the present class but is not to be construed as limiting the invention:

Example 1

In a flask fitted with a reflux condenser, thermometer, stirrer, and dropping funnel, 128 grams (0.57 mole) of 4-tertiarybutyl-2-phenylphenol was heated to a temperature of approximately 165° C. and 45.1 grams (0.32 mole) of α-chloroethylbenzene was added gradually from the dropping funnel over a period of ½ hour. The hydrogen chloride which was evolved during the reaction was absorbed in cold water. Heating was continued at 200° C. under 80 millimeters pressure for a short time to complete the removal of hydrogen chloride. The reaction mixture was then fractionally distilled under reduced pressure whereby the product, α-phenylethyl-4-tertiarylbutyl-2-phenylphenol, was obtained as a colorless viscous liquid distilling at approximately 210° C. under 3 millimeters pressure and having a specific gravity of about 1.055 at 25/25° C. and a refractive index of 1.5921 at 25° C. This product may be represented by the formula

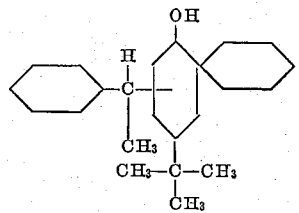

wherein the α-phenylethyl substituent occupies a position ortho or para to the hydroxyl group.

Other compounds of the present class which may be prepared by reacting an α-haloethylbenzene with an alkylated phenylphenol in the manner described above include 6-(α-phenylethyl)-4-methyl-2-phenylphenol, 2-(α-phenylethyl)-4-tertiaryhexyl - 2 - phenylphenol, 4 - (α-phenylethyl)-3-isopropyl-5-phenylphenol, 2-(α-phenylethyl) - 4 - amyl-2-phenylphenol, 6-(α-phenylethyl)-2.4-diethyl-3-phenylphenol, etc.

Other moles of applying the principles of our invention may be employed instead of those explained, change being made as regards the materials or methods herein disclosed, provided the product stated by any of the following claims or the equivalent of such stated product be obtained.

We claim:
1. A substituted phenylphenol having the general formula

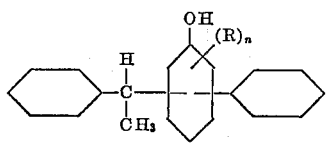

wherein R represents an alkyl group, n represents an integer not greater than 2, and the α-phenylethyl substituent occupies one of the positions ortho and para to the hydroxyl group.
2. A substituted phenylphenol having the general formula

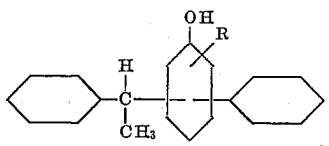

wherein R represents an alkyl group and the α-phenylethyl substituent occupies one of the positions ortho and para to the hydroxyl group.
3. A substituted phenylphenol having the general formula

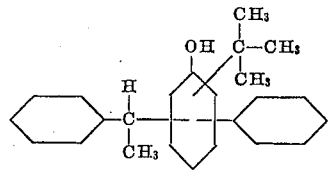

wherein the α-phenylethyl substituent occupies one of the positions ortho and para to the hydroxyl group.
4. An α-phenylethyl-4-tertiarybutyl-2-phenylphenol distilling at approximately 210° C. under 3 millimeters pressure and having a specific gravity of about 1.055 at 25/25° C.

FRED LOWELL TAYLOR.
JOHN E. LIVAK.